(12) United States Patent
Fisher

(10) Patent No.: US 7,121,191 B1
(45) Date of Patent: Oct. 17, 2006

(54) AIR-OPERATED BRAKE ACTUATOR WITH CONTROL VALVE

(75) Inventor: Albert D. Fisher, Kansas City, MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 11/218,237

(22) Filed: Sep. 1, 2005

(51) Int. Cl.
*F01B 7/00* (2006.01)

(52) U.S. Cl. .............................................. 92/63; 92/82

(58) Field of Classification Search .................. 92/63, 92/82
See application file for complete search history.

(56) References Cited

U.S. PATENT DOCUMENTS

| | | | |
|---|---|---|---|
| 5,361,877 A | 11/1994 | Graham | 188/170 |
| 5,372,059 A | 12/1994 | Pierce et al. | 92/48 |
| 5,671,654 A | 9/1997 | Plantan | 92/63 |
| 5,722,311 A | 3/1998 | Pierce et al. | 92/63 |
| 5,937,733 A | 8/1999 | Stojic | 92/63 |
| 6,029,447 A | 2/2000 | Stojic et al. | 60/453 |
| 6,588,314 B1 | 7/2003 | Stojic | 92/63 |

*Primary Examiner*—Thomas E. Lazo
(74) *Attorney, Agent, or Firm*—St. Onge Steward Johnston & Reens LLC (57) ABSTRACT

An air-operated brake actuator system of a vehicle comprises a spring brake actuator and a service brake actuator, the spring brake actuator including a sealed housing with a spring chamber and a pressure chamber, and a hollow actuator rod disposed in the spring brake actuator and axially moveable for applying a parking brake, the service brake actuator including a service pressure chamber for applying a service brake, in which a control valve of the brake actuator system includes a valve body placeable within the hollow actuator rod, the valve body including an opening formed therein for allowing fluid communication between the spring chamber of the spring brake actuator and the service pressure chamber of the service brake actuator through the hollow actuator rod, the control valve including a membrane formed of an elastic material and having a breathing hole formed there-through, the membrane positioned within the opening of the valve body and configured to seal the opening except the breathing hole when the membrane is not subject to a fluid pressure beyond a threshold level.

22 Claims, 4 Drawing Sheets

AIR-OPERATED BRAKE ACTUATOR WITH CONTROL VALVE

FIELD OF THE INVENTION

The invention relates to air-operated diaphragm brakes for vehicles, and more particularly to a service and spring brake actuator assembly and an internal vent valve mechanism for providing a sealed spring cavity which can protect from direct exposure to the atmosphere and environmental contaminants.

BACKGROUND OF THE INVENTION

Air brake systems for a vehicle such as a bus, truck, trailer and other heavy-duty vehicles or the like typically include a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Air-operated brake actuators are either piston type or diaphragm type. In the diaphragm type brake actuator, two air-operated diaphragm brake actuators are typically arranged in a tandem configuration, which includes an air-operated service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. On the other hand, the piston brake actuator operates under basically the same principles as above described, except that instead of a diaphragm, a piston reciprocates in a cylinder for applying the normal and/or parking brakes of the vehicles.

In a typical service brake actuator, the service brake housing is divided into a pressure chamber and a pushrod chamber. The pressure chamber is fluidly connected to a source of pressurized air and the pushrod chamber mounts a pushrod, which is coupled to the brake assembly, whereby the introduction and exhaustion of pressurized air into the pressurized chamber reciprocates the pushrod into and out of the housing to apply and release the operating brakes.

In a typical spring brake actuator, the spring brake housing is divided into a pressure chamber and a spring chamber. A pressure plate is positioned in the spring chamber between the diaphragm and a strong compression spring, whose opposing end abuts the housing. In one well-known configuration, an actuator rod extends through the pressure plate, through the diaphragm, into the pressure chamber, and through a dividing wall separating the spring brake actuator from the service brake actuator. The end of the actuator is fluidly connected to the pressure chamber of the service brake actuator.

When applying the parking brakes, the spring brake actuator pressure is discharged from the pressure chamber and the large force compression spring pushes the pressure plate and the diaphragm toward the dividing wall between the spring brake actuator and the service brake actuator. In this position, the actuator rod connected to the pressure plate is pushed for applying the parking or emergency brakes and thus forcing the vehicle not to move. To release the parking brake, the pressure chamber is closed to the atmosphere and pressurized air is introduced into the pressure chamber of the spring brake actuator which expands the pressure chamber, moving the diaphragm and pressure plate toward the opposing end of the spring brake actuator housing, thereby compressing the strong compression spring.

One known problem in association with spring brake actuators of this design is that as the large force compression spring is compressed, the pressure chamber increases in volume and the spring chamber decreases in volume, resulting in a pressure increase in the spring chamber unless it includes a particular system for relieving the pressure increase in the spring chamber. The build-up of pressure in the spring chamber upon the release of the brake is highly undesirable in that any pressure build-up in the spring chamber must be offset by an increased pressure in the pressure chamber in order to fully compress the spring and thus fully releasing the brake.

The pressure build-up in the spring chamber is exacerbated in that most pressurized air systems for heavy-duty vehicles operate at an industry standard maximum pressure. The combined pressure of the spring and the increase in air pressure in the spring chamber cannot approach the maximum for the brake to operate properly. As the combined force associated with the pressure of the spring and the build-up of pressure in the spring chamber approach the force applied by the maximum pressure, the brake can fail to release, only partially release, or release very slowly, all of which are undesirable.

One typical solution to cope with the pressure build-up problem in the spring chamber provides an adequate vent design in the spring chamber. The most common venting mechanism in the diaphragm brake actuator is to place holes in the housing around the spring chamber. A great disadvantage of such vent openings is that the interior of the spring chamber is thus exposed to the external environment. Environmental elements such as dirt, salt, and water can then enter the spring chamber and accelerate abrasion, corrosion, or wear on the various internal brake components such as the spring. The damage to the internal brake components by environmental elements can cause increased maintenance or premature failure of the spring and consequent replacement of the brake actuator.

An additional problem with directly externally venting the spring chamber is that the vehicle, such as a tractor/trailer, is often parked for extended periods in a bay adjacent a dock. The bays are typically sloped and below grade. Under heavy rain or snow conditions, a bay can fill with water to a height above the vent opening and flood the interior of the spring chamber. Although the water would normally be expelled from the spring chamber through the vent openings as the brake is released, the flooding can accelerate corrosion and introduce other environmental hazards. In certain environmental conditions, the water can freeze, which may prevent release of the brake altogether.

Because of the problems associated with the introduction of environmental elements into the spring chamber through the vent openings, attempts have been made to seal the spring chamber to prevent the introduction of various environmental elements. Sealing the spring chamber, however, creates other problems in that a vacuum or a lower pressure tends to form in the spring chamber when the parking brakes are applied, unless a system is provided for compensating or relieving the low pressure. If the low pressure is great enough, it can slow the response time of the parking brakes, which is not desirable.

Several known attempts to eliminate the pressure build-up and vacuum creation in the spring chamber while keeping out environmental elements include, for example, fluidly connecting the spring chamber of the spring brake actuator to either chamber of the service brake actuator, placing a filter in the vent opening, and providing an internal fluid flow path from the spring chamber through the actuator rod and into the service brake pressure chamber. All of these solutions are compromises in that they do not provide complete solutions or introduce other problems instead thereof. For example, the filtered vent openings inherently permit external air to enter the brake, yielding a brake that is not completely sealed. As long as the filter is open there is some possibility that external elements can enter the brake through the filter such as if the brake actuator is submerged in a flooded bay.

An example of a filtered vent opening is found in U.S. Pat. No. 6,029,447 issued Feb. 29, 2000. The internal fluid paths extending through the actuator require two-way valves of complex design that control the fluid flow to release a pressure build-up in the spring chamber while permitting the introduction of pressurized fluid to prevent a vacuum in the spring chamber. Examples of such two-way valves are also disclosed in U.S. Pat. No. 5,722,311, issued Mar. 3, 1998 and U.S. Pat. No. 5,372,059, issued Dec. 13, 1994.

On the other hand, an example of one-way type valve is disclosed in U.S. Pat. No. 6,588,314, issued Jul. 8, 2003, the entire disclosure of which is incorporated herein by reference. This vent design may provide an effective solution to the pressure build-up problem in the spring chamber by permitting internal air vents from the spring chamber to the service brake pressure chamber. However, the compression spring in the spring chamber must be selected to have a much larger force than conventional springs of the spring chamber to overcome the low pressure or vacuum creation in the spring chamber when applying the spring brake, or otherwise the spring brake cannot properly be applied within the desired application time.

It is desirable to have an air-operated brake actuator including a spring brake actuator wherein the spring brake actuator is sealed and pressure increase and vacuum formation are remedied without the need for complex or high maintenance valve and filter systems and/or without requiring a much larger force spring in the spring chamber.

SUMMARY OF THE INVENTION

The invention is generally directed to an air-operated service and spring brake actuator system, the spring brake actuator of which has a sealed cavity and a control valve mechanism which can protect from direct exposure to the atmosphere and environmental contaminants while providing a two-way breather valve function for controlling pressure build-up and vacuum creation in the spring chamber of the spring brake actuator.

According to one aspect of the invention, an air-operated brake actuator for applying parking brakes of a vehicle comprises: a sealed housing including a first end wall, a second end wall opposing the first end wall, and a peripheral side wall extending between the first and second end walls, the first end wall, the second end wall and the peripheral side walls together defining an interior cavity therein; a diaphragm spanning the interior cavity, and dividing the interior cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; a spring disposed in the spring chamber and biasing the diaphragm in a direction toward the second end wall; a hollow actuator rod having one end coupled to a central opening of the diaphragm and another end extending through the second end wall, wherein when the diaphragm is in the second position the hollow actuator rod is positioned to apply the parking brake and when the diaphragm is in the first position the hollow actuator rod is positioned to release the parking brake; and a control valve positioned within the hollow actuator rod, the control valve including a valve body with an opening formed therein for allowing fluid communication between the spring chamber and a side of the second end wall opposite the pressure chamber through the hollow actuator rod, the control valve including a membrane formed of an elastic material and having a breathing hole formed therethrough, the membrane positioned within the opening of the valve body and configured to seal the opening except the breathing hole when the membrane is not subject to a fluid pressure beyond a predetermined level.

Preferably, the opening of the valve body has generally a circular cross-section, and the membrane has a circular membrane portion configured to abut against a surrounding wall defined by the opening of the valve body. The opening of the valve body typically includes an axial cylindrical opening formed at a lower interior area of the valve body, a conical opening extending axially from the cylindrical opening, and a small central opening extending from the conical opening and to a top surface of the valve body, and the membrane is positioned within the opening at the juncture of the cylindrical opening and the conical opening.

Preferably, the control valve further includes a retainer securely received within a lower portion of the cylindrical opening, the retainer having a generally axial fluid path defined there-about for allowing fluid flow through the fluid path. The retainer typically has a circular shape having two flat edges formed at opposing sides of the circular retainer, and the fluid path of the retainer is formed at the gaps defined between the flat edges and the cylindrical opening of the valve body. The valve body of the control valve may include fluid channels formed at a bottom surface of the valve body in a radial direction and corresponding to the gaps defined by the flat edges and the cylindrical opening of the valve body.

Preferably, the control valve further includes a filter member attached at the top surface of the valve body, and the valve body of the control valve has a central recess portion formed at the top surface of the valve body.

In one preferred embodiment of the invention, when a fluid pressure in the spring chamber and the interior of the hollow actuator rod reaches a threshold point, the circular membrane portion of the elastic membrane is deformed axially toward the retainer for allowing fluid flow around the circumference of the circular membrane portion and relieving pressure build-up in the spring chamber.

In another preferred embodiment of the invention, the membrane of the control valve includes a spherical head portion formed at the center of the membrane and configured to close the small central opening of the valve body when the membrane is deformed in a corresponding direction. Thus, when a fluid pressure in the side of the second end wall opposite the pressure chamber reaches a threshold pressure the membrane is pushed against an inner wall defined by the conical opening with the head portion closing the small central opening of the valve body for sealing the opening of the control valve.

According to one aspect of the invention, a control valve for use in an air-operated brake actuator system of a vehicle is disclosed, in which the brake actuator system includes a spring brake actuator and a service brake actuator arranged in tandem, and the spring brake actuator includes a sealed housing with a spring chamber and a pressure chamber, and a hollow actuator rod is disposed generally in the spring brake actuator and axially moveable towards the service brake actuator for applying a parking brake, and the service brake actuator includes a service pressure chamber for applying a service brake. The control valve of the invention comprises: a valve body placeable within the hollow actuator rod, the valve body including an opening formed therein for allowing fluid communication between the spring chamber of the spring brake actuator and the service pressure chamber of the service brake actuator through the hollow actuator rod, the control valve including a membrane formed of an elastic material and having a breathing hole formed there-through, the membrane positioned within the opening of the valve body and configured to seal the opening except the breathing hole when the membrane is not subject to a fluid pressure beyond a predetermined level.

In one preferred embodiment of the invention, when a fluid pressure in the spring chamber and the interior of the hollow actuator rod reaches a predetermined point, the elastic membrane is deformed axially for allowing fluid flow around the circumference of the membrane, thus capable of relieving pressure build-up in the spring chamber.

In another preferred embodiment of the invention, the membrane of the control valve is configured to close the entire opening of the valve body when the circumference of the membrane is deformed against the wall of the valve body in the opening. Thus, when a fluid pressure in the service pressure chamber reaches a threshold pressure the membrane is pushed against an inner wall of the opening for closing and sealing the opening in the valve body of the control valve.

DETAILED DESCRIPTION OF THE DRAWINGS

Figure 1:
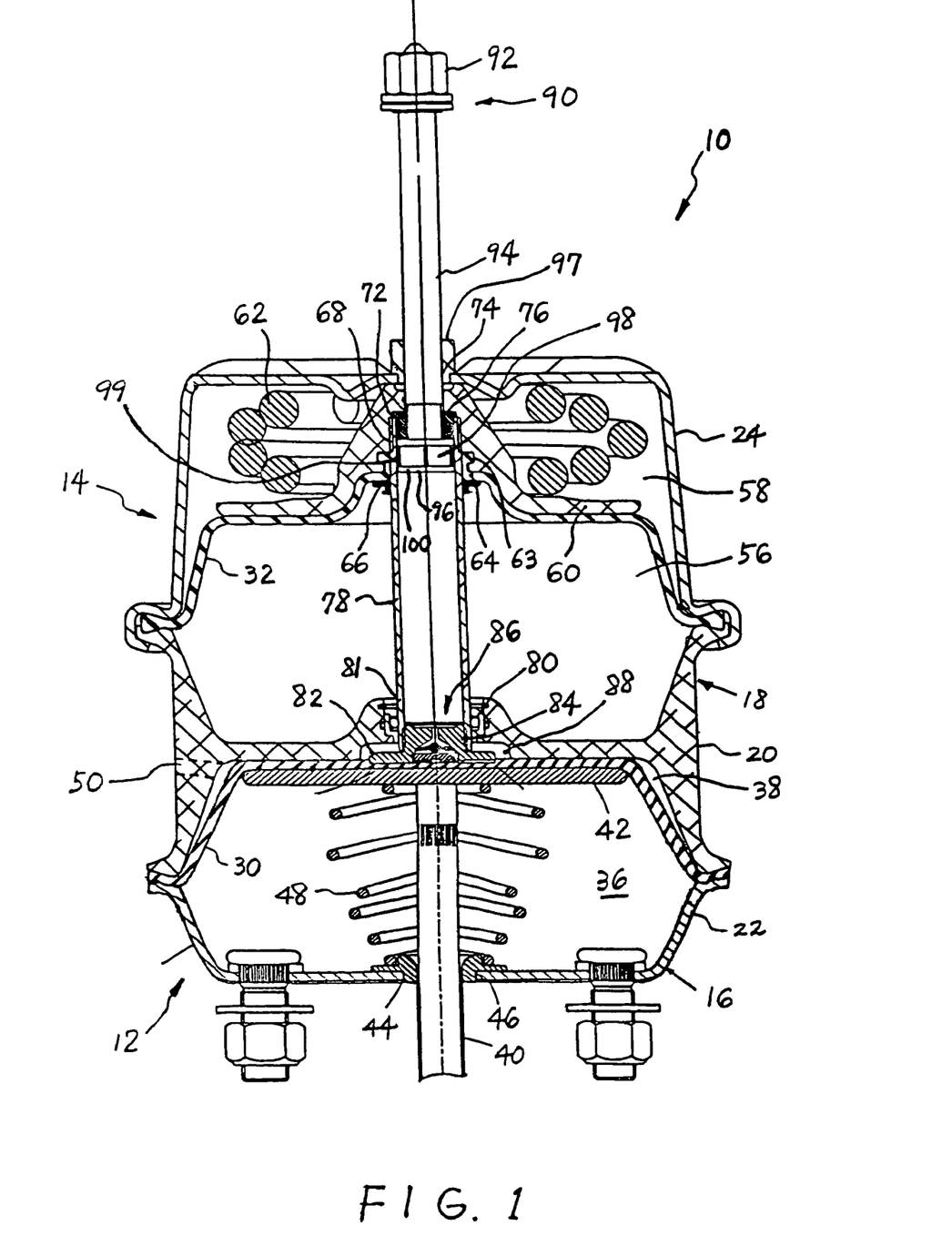
FIG. 1 illustrates a sectional view of a tandem-type air-operated brake actuator according to the invention and illustrating a two-way control valve for controlling fluid flow between a spring chamber and the service pressure chamber in which the caging bolt is in a retracted position.
Figure 2:
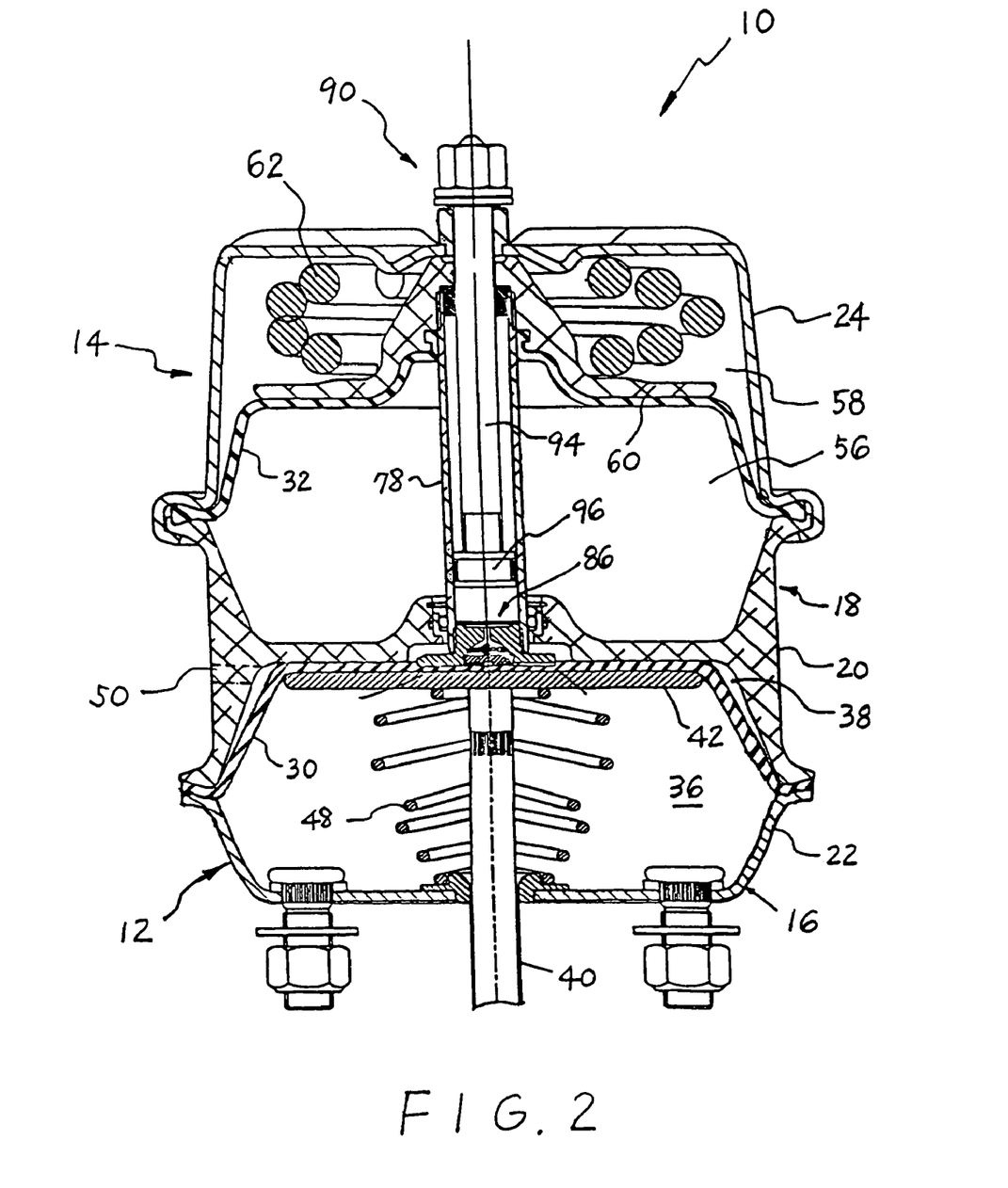
FIG. 2 illustrates a sectional view of a tandem-type air-operated brake actuator of FIG. 1, illustrating the condition where the spring brake is not actuated and the caging bolt is in a extended position.

FIGS. 1 and 2 illustrate a tandem-type air-operated brake actuator 10 comprising a service brake actuator 12 in combination with a spring brake actuator 14. The service brake actuator 12 applies and releases the service or operating brakes of a vehicle. The spring brake actuator 14 is used to apply the emergency or parking brakes of the vehicle.

Both the service brake actuator 12 and the spring brake actuator 14 comprise a housing 16, 18, which are formed by an adapter housing 20 to which are coupled a service brake cover 22 and a spring brake cover 24, respectively. The adapter housing 20 defines a common dividing wall separating the service brake housing 16 from the spring brake housing 18 while forming a portion of each. It is within the scope of the invention for the adapter housing 20 to be replaced with discrete cover elements, much like the service brake cover 22 and the spring brake cover 24.

Movable members, which in this embodiment include elastomeric diaphragms 30, 32, span the interior of the service and spring brake housings 16, 18, respectively, by having a peripheral edge of the diaphragm compressibly retained between the adapter housing 20 and the corresponding service and spring brake covers 22, 24. It will be understood that the invention will also apply to a piston-type brake where instead of a diaphragm, a piston spans the interior of a cylindrical spring brake housing.

Looking specifically at the service brake actuator 12, the diaphragm 30 fluidly divides the service brake actuator 12 into a pushrod chamber 36 and a pressure chamber 38. A pushrod 40, having a pressure plate 42 disposed at one end, is provided within the pushrod chamber 36, with the pressure plate 42 abutting the diaphragm 30 and the pushrod 40 extending through a bearing 44 disposed in an opening 46 in the service brake cover 22. A return spring 48 is disposed between the bearing 44 and the pressure plate 42 to aid in biasing the pressure plate 42 along with the pushrod 40 into the interior of the service brake housing 16. Although not shown, in an S-cam brake assembly, the end of the pushrod 40 is coupled to a slack adjuster of an S-cam brake assembly whereby the reciprocation of the pushrod 40 relative to the service brake housing 16 results in the application and release of the service brakes.

The pressure chamber 38 is fluidly connected to a source of pressurized air through an inlet port 50. As the operator of the vehicle applies the brake pedal, pressurized air is introduced or exhausted from the pressure chamber 38 through the inlet port 50 to reciprocate the pushrod 40. The addition of pressurized air into the pressure chamber 38 urges the pressure plate 42 and pushrod 40 from the adapter housing 20 toward the service brake cover 22 to apply the service brakes.

Looking more closely at the spring brake actuator 14, the diaphragm 32 fluidly divides the spring brake housing 18 into a pressure chamber 56 and spring chamber 58. The pressure chamber 56 is fluidly connected to a source of pressurized air through a port that is not shown in the drawings, but is substantially identical to port 50. Typically, the pressure chamber 56 is supplied by a pressurized air system that is physically distinct from the pressurized air system supplying the service brake actuator 12.

A pressure plate 60 is provided in the spring chamber 58, with a large force compression spring 62 disposed between the pressure plate 60 and the spring brake cover 24. The pressure plate 60 comprises an annular groove 63 in which is received an inner radial edge 64 of the diaphragm 32. A retaining ring 66 can be provided to press fit adjacent the annular groove 63 to retain the inner edge 64 of the diaphragm 32 to the pressure plate 60. The pressure plate 60 further includes an axial stepped opening 68 in which are defined an actuator rod shoulder and a bearing shoulder 72, for instance. The axial opening 68 is aligned with an opening 74 in the spring brake cover 24.

An annular bearing or flange guide 76 is mounted within the axial opening 68 and located by contacting the bearing shoulder 72. A hollow actuator rod 78 has one end press fit within the axial opening 68 and positioned by abutting a flange portion of the annular bearing 76. The connection structure of the diaphragm 32 and the actuator rod 78 to the pressure plate 60 can differ from the above illustrated one depending upon particular design of the spring brake actuator 14. The annular bearing 76 and the pressure plate 60 define therein air passage ways or clearances (not shown) along the caging bolt 94 to allow air flow that air can flow back and forth between the spring chamber 58 and the inner cavity of the hollow actuator rod 78.

The other end of the actuator rod 78 extends through a bearing and seal assembly 80 disposed within an opening 81 formed in the adapter housing 20. The bearing and seal assembly 80 are well known.

The transfer plate 82 closes the end of the actuator rod 78 opposite the pressure plate 60. The transfer plate 82 includes a threaded protrusion 84 that is threadably received within the interior of the actuator rod 78. The transfer plate 82 and the protrusion 84 together form a valve body and house a two-way breath valve (or control valve) 86 according to the invention. Radially extending fluid channels 87 (see FIGS. 3 and 4) are formed in the lower face of the transfer plate 82 which is preferably sized to be received within a recess 88 in the adapter housing.

The brake actuator further comprises a caging bolt assembly 90 comprising an adjustment nut 92 threaded onto and permanently affixed to a caging bolt 94 which terminates in a caging bolt head 96. The caging bolt assembly couples the pressure plate and actuator rod to the spring brake actuator 14 by placing the caging bolt 94 and caging bolt head 96 within the interior of the actuator rod 78, extending the other end of the caging bolt 94 through the axial opening 68, threading the caging bolt through a cap or collar 97, which is riveted to the spring brake head 24 in a substantially sealed manner, and the adjustment nut 92 is permanently affixed on the caging bolt. Since the nut 92 and caging bolt head 96 are greater in diameter than the minor diameter of the passage 68, the caging bolt couples the pressure plate to the spring brake head 24.

The caging bolt head 96 preferably includes a bearing 98 disposed between opposing collars 100. The bearing 98 contacts the inner surface of the actuator rod 78 to prevent the collars 100 and caging bolt 94 from contacting the interior of the actuator rod 78 while helping to guide the reciprocal movement of the actuator during the application and release of the emergency brakes. Axial slots 99 are formed in the face of the bearing to form a fluid flow path around the bearing.

The caging bolt assembly 90 is used to mechanically retract and hold the large force compression spring 62 in a compressed state (as particularly shown in FIG. 1). By turning the adjustment nut 92, it is possible to threadably withdraw the caging bolt out of the spring brake housing 18. As the caging bolt is withdrawn, the caging bolt head 96 contacts the bearing 76 at the upper end of the actuator rod 78 to withdraw the actuator and pressure plate along with the caging bolt and thereby compress the spring. The caging of the large force compression spring is well known and typically used during the assembly of the brake actuator and/or for the mechanical release of the brakes in the case of a failure or absence of the compressed air system.

Figure 3:
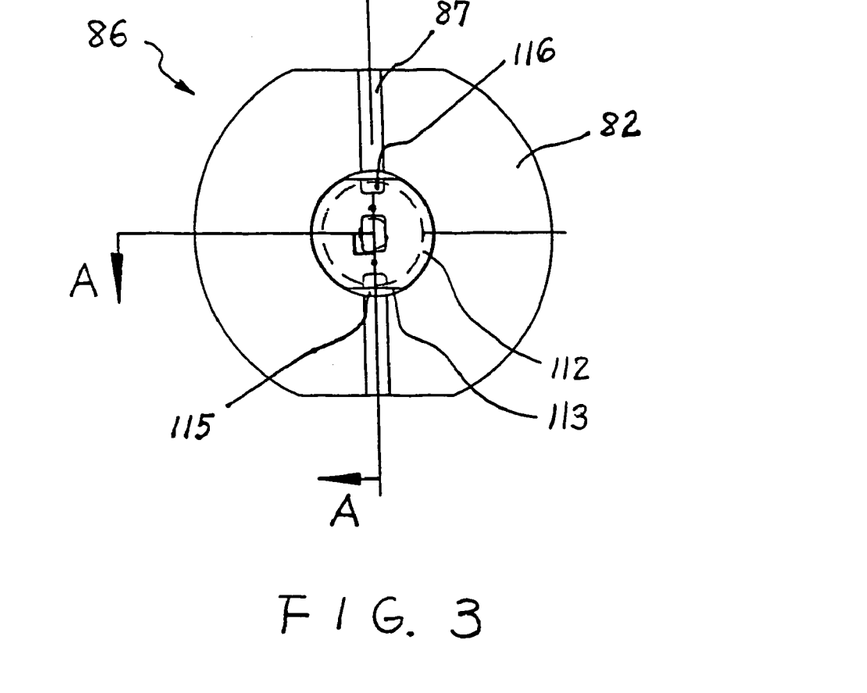
FIG. 3 is an enlarged bottom view of the control valve of FIG. 1.
Figure 4:
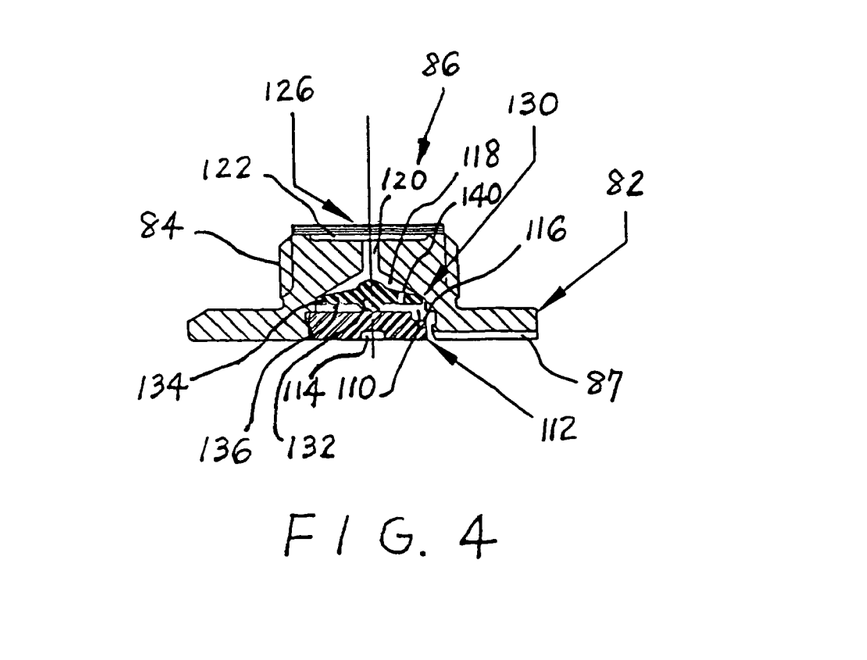
FIG. 4 is an enlarged cross-sectional view of the control valve taken along the line A—A of FIG. 3, illustrating the diaphragm contained in the control valve is in a normal sate without subjecting to a fluid pressure beyond a certain level.

Referring now to FIGS. 3 and 4, the control valve 86 is described in greater detail. The threaded protrusion 84 and the transfer plate 82 together effectively function as a valve body and define an axial cylindrical opening 110 at a lower interior area thereof. A retainer 112 is press fit at a lower end of the opening 110 preferably abutting against an annular shoulder in the opening and in a manner substantially closing the opening except a small opening or path defined therein for allowing fluid communication there-through. As shown in FIG. 3, the retainer 112 can be of circular shape having two flat edges 113 formed at opposing sides of the circular retainer 112 leaving lateral gaps 115 in the circular opening 110. The gaps 115 are aligned with the radially-extending fluid channels 87 for providing a continuous radial flow passage through the retainer 112 and along the lower face of the transfer plate 82. The bottom surface of the retainer 112 is flat and flush with the bottom surface of the transfer plate 82, and includes a recess 114 useable for guiding assembly of the retainer 112 into the opening 110. The top surface of the retainer 112 is also preferably flat and includes radially extending slots 116 at the flat edges 113 and in alignment with the channels 87 when the retainer 112 is assembled into the valve body 82 and 84. The slots 116, flat edges 113, and channels 87 form a continuous air flow path through the sides of the retainer 112 and along the transfer plate 82. However, the shape of the retainer and fluid channels is not limited to this configuration as shown, and other shapes can be adopted as long as they can adequately provide a substantial closing of the opening 110 with a limited fluid path allowing air flow there-around. At the upper side of the cylindrical opening 110 is led to a conical cavity 118 extending upwards from the opening 110, and a small central opening 120 is formed through the top surface of the valve body 84. The top surface of the valve body 84 preferably includes a central recess portion 122, and a filter member 126 is securely attached on the top surface of the valve body 84 and overlies the axial opening. The filter is preferably made from a synthetic, polymer or other filter material and attached to the valve body, for example, with a pressure sensitive adhesive backing to secure the filter to the body. Preferably, the filter member 126 is a porous and gas permeable polymer membrane having hydrophobic and oleophobic properties and a pore size of about one micron. An acceptable filter element comprises a treated, expanded polytetrafluoroethylene (PTFE), available from W. L. Gore and Associates and sold under the brand name Gore-Tex®.

Within a cavity defined by the upper portion of the cylindrical opening 110 and the conical cavity 118, a diaphragm or membrane 130 is seated with a circular circumference thereof abutting the juncture in the wall of the conical cavity 118 and the cylindrical cavity 110 to seal the opening, as shown in FIG. 4. The membrane 130 includes a spherical head portion 132 and circular membrane portion 134 extending radially outwards from the head portion 132, which is preferably formed of rubber or polymer material having a suitable strength and elasticity in order for the membrane portion 134 to be elastically deformed when an air pressure exceeding a certain level is applied to the membrane 130. When the membrane 132 is seated in the cavity of the valve body 84 without subjecting to any external air pressure, the circular bottom of the head portion 132 contacts with the top surface of the retainer 112 and a small annular space 136 is formed between the bottom surface of the membrane portion 134 and the top surface of the retainer 112, which provides a clearance for allowing elastic deformation of the membrane portion 134 therein. The membrane portion 134 further includes one or plural through-holes (or breathing holes) 140 with a size much smaller than the central hole 120 of the valve body 84.

Figure 5:
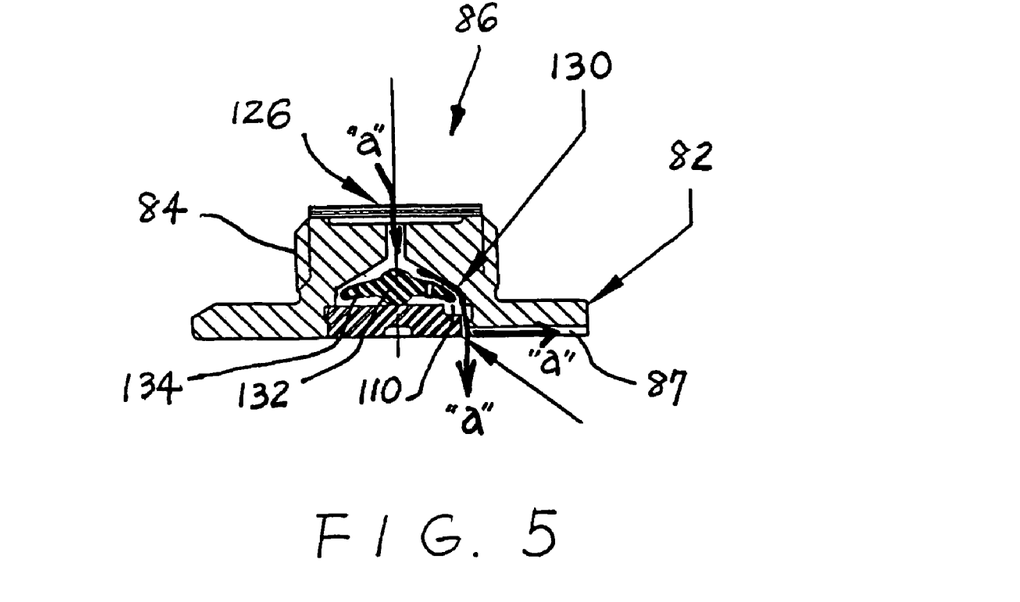
FIG. 5 is an enlarged cross-sectional view of the control valve taken along the line A—A of FIG. 3, illustrating the diaphragm contained in the control valve is in a state subjecting to a fluid pressure from the spring chamber of the spring brake actuator.
Figure 6:
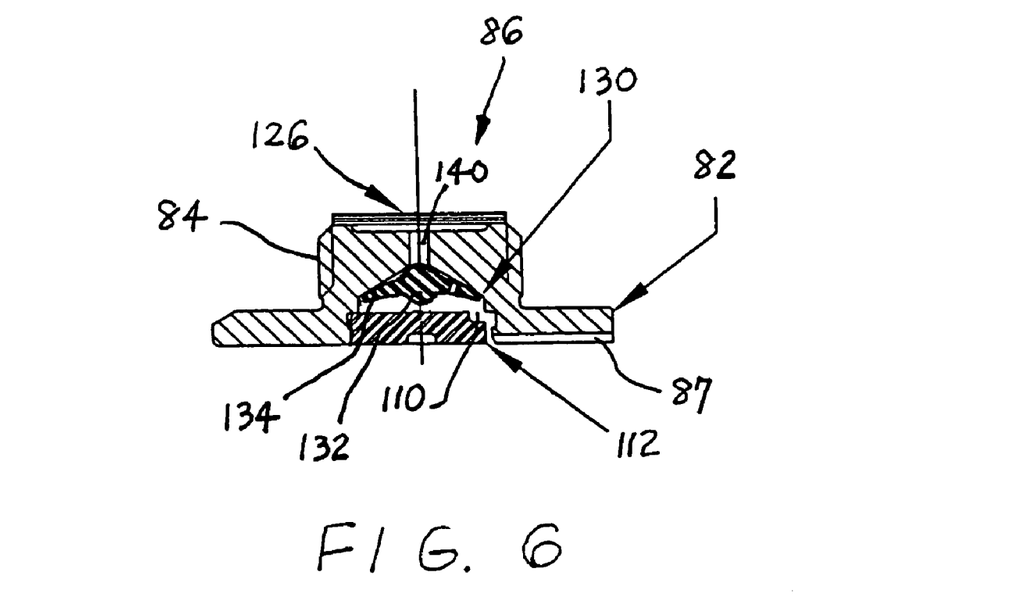
FIG. 6 is an enlarged cross-sectional view of the control valve taken along the line A—A of FIG. 3, illustrating the diaphragm contained in the control valve is in a state subjecting to a fluid pressure from the pressure chamber of the service brake actuator.

Referring now to FIGS. 4–6, operating conditions of the brake actuators and the control valve 86 are described hereafter. As illustrated in FIG. 4, the membrane portion 134 of the elastic membrane 130 naturally biases against the side wall in the juncture of the cylindrical opening 110 and the conical opening 118 so that it seals the opening for preventing free flow of air there through and thus between the spring chamber 58 and the service actuator pressure chamber 38. In this state, however, air flow of limited amount is allowed only through the small through-holes 140 of the membrane 130.

When the parking brakes are released, pressurized air enters the pressure chamber 56 of the spring brake actuator 14. As the volume of the pressure chamber 56 increases, the volume of the spring chamber 58 decreases, thus increasing the pressure of the air contained therein. The pressurized air in the spring chamber is fluidly connected to the control valve 86 through the axial opening 68 of the pressure plate 60 and through the inner cavity of the actuator rod 78. As the pressure increases in the spring chamber 58, it can reach a point where it overcomes the elastic force of the membrane 130 with its circumference abutting the inner wall of the valve body 84, and pushes the circumferential area of the elastic membrane 130 axially against the elastic force of the membrane portion 134 (as shown in FIG. 5). This permits air to flow from the central opening 120, around the circumference of the membrane 130, and through the fluid paths created by the body openings or lateral gaps 115 and along channels 87, and into the service brake pressure chamber 38, as illustrated with arrows "a" in FIG. 5. In this manner, the pressure build-up in the "sealed" spring chamber 58 is effectively released by operation of the control valve of the invention, without providing a vent opening in the spring chamber as in conventional spring brake actuators described above.

After the enhanced pressure is released from the spring chamber 58, the membrane 130 recovers its original shape as shown in FIG. 4 and again seals the opening of the control valve 86 except the small breathing holes 140 of the membrane. FIG. 2 illustrates the state where the pressure build-up is released after releasing of the parking brake actuator.

To the contrary, when the parking brake is applied by exhausting the pressurized air from the pressure chamber 56 of the spring brake actuator, the compression spring 62 pushes the pressure plate 60 and the diaphragm 32 toward the dividing wall between the spring brake actuator 14 and the service brake actuator 12. As a result, the actuator rod 78 connected to the pressure plate 60 is pushed for applying the parking or emergency brakes and thus forcing the vehicle not to move in a manner as described above and well known in the art. However, during the expanding process of the spring chamber 58, a vacuum or low pressure is created by the forced movement of the diaphragm 32, which can delay the application time of the spring brakes or be otherwise harmful to proper operation of the spring brakes. In this operation, before applying the parking brakes, the membrane 130 of the control valve is in a normal or non-stressed state as shown in FIG. 4. In this state, any air flow passing through the control valve 86 must pass only through the small apertures 140 of the membrane. The small apertures 140 allow some air flow to fill the expanding volume of the spring chamber 58 as when the spring brake is being applied. This "breathing" air can preferably be supplied through relevant ports, such as port 50, as the service brake actuator 12 is released. By selecting a proper dimension of the aperture 140 according to the particular specification of the service and spring brake system of the vehicle, the vacuum creation problem in the spring chamber is effectively solved.

With reference in particular to FIG. 6, another operating condition of the brake system of the invention is described herein. When the service brakes are applied, pressurized air flows into the pressure chamber 38 of the service brake actuator 12. Here, the pressure of the pressurized air in the service pressure chamber 38 exceeds a threshold level and the membrane 130 is pushed against the conical wall of the opening 118, and the head portion 132 is seated against the central opening 140 of the valve body 84 while the membrane portion 134 is deformed to abut the conical wall, thus sealing the entire opening of the control valve 86. In this manner, the spring chamber 58 can avoid undesired build-up of fluid pressure therein. On the contrary, when the service brakes are released, the control valve 86 again recovers its normal state as shown in FIG. 4.

As described above, one advantage of the sealed air-operated brake actuator 10 according to the invention is that the spring brake actuator 14 is completely sealed with respect to the atmosphere. The control valve with two-way communication or breathing ability permits the relief of pressure in the sealed spring chamber and it also permits the vacuum generation problems in the spring chamber in response to the operation and releasing of the brakes. The structure and construction of the control valve is relatively simple comparing to the conventional two-way or one way valve discussed above, in which the brake system of the invention does not require a vent opening in the spring chamber and coil springs retained in the control valve which often malfunction over extended usage of the brake system. In addition, there is no need for selecting a large force compression spring 62 to have an enhanced spring force in order to overcome the effects of vacuum generation in the spring chamber 58 occurring when the parking brakes are applied, as in the prior art brake system disclosed in U.S. Pat. No. 6,588,314, for example.

While the invention has been specifically described in connection with certain specific embodiments thereof, it is to be understood that this is by way of illustration and not of limitation and that various changes and modifications in form and details can be made thereto, and the scope of the appended claims should be construed as broadly as the prior art will permit.

What is claimed is:

1. An air-operated brake actuator for applying parking brakes of a vehicle, comprising:
   a sealed housing including a first end wall, a second end wall opposing the first end wall, and a peripheral side wall extending between the first and second end walls, the first end wall, the second end wall and the peripheral side walls together defining an interior cavity therein;
   a diaphragm spanning the interior cavity, and dividing the interior cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted;

a spring disposed in the spring chamber and biasing the diaphragm toward the second position;

a hollow actuator rod having one end coupled to a central opening of the diaphragm and another end extending through the second end wall, wherein when the diaphragm is in the second position the hollow actuator rod is positioned to apply the parking brake and when the diaphragm is in the first position the hollow actuator rod is positioned to release the parking brake; and a control valve positioned within the hollow actuator rod, the control valve including a valve body with an opening formed therein for allowing fluid communication between the spring chamber and a side of the second end wall opposite the pressure chamber through the hollow actuator rod, the control valve including a membrane formed of an elastic material and having a breathing hole formed therethrough, the membrane positioned within the opening of the valve body and configured to seal the opening except the breathing hole when the membrane is subject to a fluid pressure below a threshold level.

2. The brake actuator of claim 1, wherein the control valve allows fluid to pass through the control valve to relieve pressure build-up in the spring chamber when the membrane is subject to a fluid pressure above the threshold level.

3. The brake actuator of claim 1, wherein the opening of the valve body has generally a circular cross-section, and the membrane has a circular membrane portion configured to abut against a surrounding wall defined by the opening of the valve body.

4. The brake actuator of claim 3, wherein the opening of the valve body includes an axial cylindrical opening formed at a lower interior area of the valve body, a conical opening extending axially from the cylindrical opening, and a small central opening extending from the conical opening and to a top surface of the valve body, and the membrane is positioned within the opening at the juncture of the cylindrical opening and the conical opening.

5. The brake actuator of claim 4, wherein the control valve further includes a retainer securely received within a lower portion of the cylindrical opening, the retainer having a generally axial fluid path defined thereabout for allowing fluid flow through the fluid path.

6. The brake actuator of claim 5, wherein the retainer has a circular shape having two flat edges formed at opposing sides of the circular retainer, and the fluid path of the retainer is formed at the gaps defined between the flat edges and the cylindrical opening of the valve body.

7. The brake actuator of claim 6, wherein the valve body of the control valve includes fluid channels formed at a bottom surface of the valve body in a radial direction and corresponding to the gaps defined by the flat edges and the cylindrical opening of the valve body.

8. The brake actuator of claim 5, wherein the control valve further includes a filter member attached at the top surface of the valve body.

9. The brake actuator of claim 8, wherein the valve body of the control valve has a central recess formed at the top surface of the valve body.

10. The brake actuator of claim 5, wherein when a fluid pressure in the spring chamber and the interior of the hollow actuator rod reaches a threshold level the circular membrane portion of the elastic membrane is deformable axially toward the retainer for allowing fluid flow around the circumference of the circular membrane portion and relieving pressure build-up in the spring chamber.

11. The brake actuator of claim 5, wherein the membrane of the control valve includes a spherical head portion formed at the center of the membrane and configured to close the small central opening of the valve body when the membrane is deformed in a corresponding direction.

12. The brake actuator of claim 11, wherein when a fluid pressure in the side of the second end wall opposite the pressure chamber reaches a threshold level the membrane is pushed against an inner wall defined by the conical opening with the head portion closing the small central opening of the valve body for sealing the opening of the control valve.

13. A control valve for use in an air-operated brake actuator system of a vehicle, the brake actuator system including a spring brake actuator and a service brake actuator arranged in tandem, the spring brake actuator including a sealed housing with a spring chamber and a pressure chamber, and a hollow actuator rod disposed generally in the spring brake actuator and axially moveable towards the service brake actuator for applying a parking brake, the service brake actuator including a service pressure chamber for applying a service brake, said control valve comprising:

a valve body disposed within the hollow actuator rod, the valve body including an opening formed therein for allowing fluid communication between the spring chamber of the spring brake actuator and the service pressure chamber of the service brake actuator through the hollow actuator rod, the control valve including a membrane formed of an elastic material and having a breathing hole formed therethrough, the membrane positioned within the opening of the valve body and configured to seal the opening except the breathing hole when the membrane is subject to a fluid pressure below a threshold level.

14. The control valve of claim 13, wherein the control valve allows fluid to pass through the control valve to relieve pressure build-up in the spring chamber when the membrane is subject to a fluid pressure above the threshold level.

15. The control valve of claim 13, wherein the opening of the valve body has generally a circular cross-section, and the membrane has a circular membrane portion configured to abut against a surrounding wall defined by the opening of the valve body.

16. The control valve of claim 15, wherein the opening of the valve body includes an axial cylindrical opening formed at a lower interior area of the valve body, a conical opening extending axially from the cylindrical opening, and a small central opening extending from the conical opening and to a top surface of the valve body, and the membrane is positioned within the opening at the juncture of the cylindrical opening and the conical opening.

17. The control valve of claim 16, wherein the control valve further includes a retainer securely received within a lower portion of the cylindrical opening, the retainer having a generally axial fluid path defined thereabout for allowing fluid flow through the fluid path.

18. The control valve of claim 17, wherein the retainer has a circular shape having two flat edges formed at opposing sides of the circular retainer, and the fluid path of the retainer is formed at the gaps defined between the flat edges and the cylindrical opening of the valve body.

19. The control valve of claim 18, wherein the valve body of the control valve includes fluid channels formed at a bottom surface of the valve body in a radial direction and corresponding to the gaps defined by the flat edges and the cylindrical opening of the valve body.

20. The control valve of claim 17, wherein the control valve further includes a filter member attached at the top surface of the valve body.

21. The control valve of claim 17, wherein when a fluid pressure in the spring chamber and the interior of the hollow actuator rod reaches a threshold level the circular membrane portion of the elastic membrane is deformable axially toward the retainer for allowing fluid flow around the circumference of the circular membrane portion and relieving pressure build-up in the spring chamber.

22. The control valve of claim 17, wherein the membrane of the control valve includes a spherical head portion formed at the center of the membrane, and when a fluid pressure in the service pressure chamber reaches a threshold level the membrane is pushed against an inner wall defined by the conical opening and the head portion closes the small central opening of the valve body to seal the entire openings formed in the control valve.

* * * * *